Jan. 2, 1934.   C. J. SMITH   1,942,071
PROCESS OF PURIFYING HYDROCARBON OIL FROM HYDROGEN SULPHIDE
Filed March 13, 1930
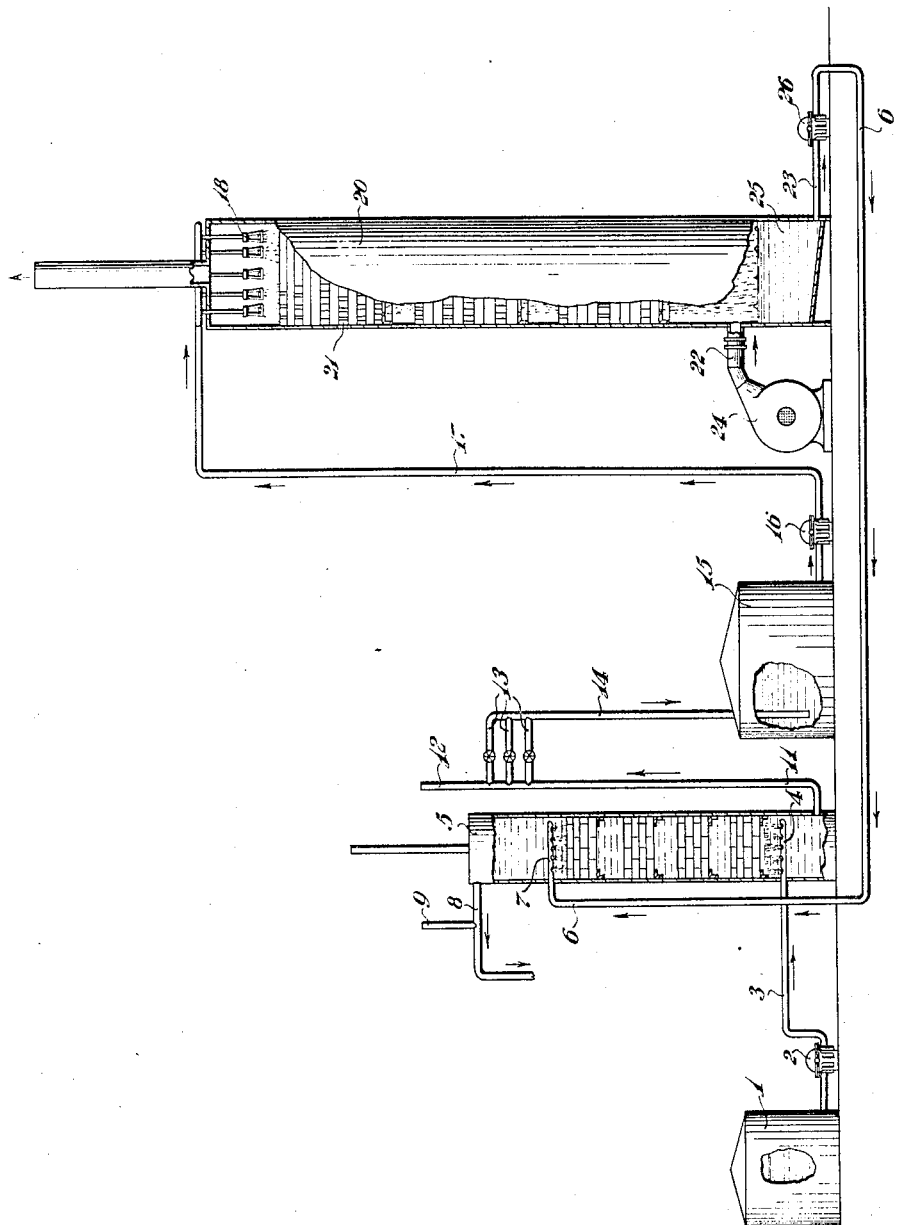
INVENTOR.
Charles J. Smith.
BY
Jesse P. Langley
ATTORNEY.

Patented Jan. 2, 1934

1,942,071

UNITED STATES PATENT OFFICE 1,942,071

PROCESS OF PURIFYING HYDROCARBON OIL FROM HYDROGEN SULPHIDE

Charles J. Smith, Pittsburgh, Pa., assignor to The Koppers Company of Delaware, a corporation of Delaware Application March 13, 1930. Serial No. 435,503

6 Claims. (Cl. 196—32)

My invention relates to the treatment of hydrocarbon oils such as petroleum, petroleum distillates, hydrocarbon oils obtained from natural gas, coal gas and the like, and more particularly to the removal therefrom of sulphur impurities such, for example, as hydrogen sulphide and analogous impurities.

It has been customary for many years to treat such oils with solutions of sodium hydroxide for the removal therefrom of hydrogen sulphide and other sulphur impurities. However, this procedure has not in the past been carried out with regeneration and recirculation of the purifying liquid, and is therefore uneconomical for the reason that fresh amounts of sodium hydroxide or its equivalent must be employed for each corresponding unit of impurity removed.

An object of my invention is to provide means for purifying oil in a continuous and cyclic manner and whereby an absorption agent may be used again and again with high efficiency.

A further object of my invention is to provide a method of purifying oil by means of a recirculated and regenerated purifying liquid and wherein a high efficiency of regeneration may be obtained.

My invention has for further object such other operations, advantages or results as may hereinafter be found to obtain.

My invention contemplates the substantially continuous washing of the oil to be purified with a regenerable purifying liquid, that is, a liquid capable of absorbing hydrogen sulphide or analogous impurities from the oil in amounts sufficient to accomplish a worthwhile purification of the oil (but not necessarily a complete purification) and of then being rendered capable of further use for the same purpose by treatment with air, heating, reaction with a substance having a greater affinity for hydrogen sulphide than the liquid itself or any other treatment which can be carried out substantially without interrupting the cyclic recirculation of the purifying liquid.

By regeneration is meant merely the renewal of at least a substantial portion of the original capacity of the liquid for absorption of the impurity removal of which is desired, but not necessarily a re-creation of the compound or compounds originally present in the liquid or a return to the full original capacity of said liquid for absorbing said impurity.

I prefer to employ as the purifying liquid a solution containing a compound of an alkali-forming metal or radical such, for example, as sodium, potassium, calcium, magnesium or ammonium and of these I ordinarily prefer a compound of sodium as being the most advantageous with respect to the ultimate economy of the system.

For example, I may employ a solution of sodium carbonate. A solution of sodium hydroxide itself may be used in the first instance, as for example in starting up the process, but in this case it is necessary in order to regenerate or actify the solution to introduce carbon dioxide either as a gas or in solution, or some other acidic substance of about the same strength.

When employing such a solution of sodium carbonate, for example, of from 1 to 6% alkalinity, the regeneration or actification after absorption of impurity from the oil treated may be accomplished by subjecting the solution to a current of gas such as air or other gas containing little or no hydrogen sulphide, or by heating the solution, or both, the reaction involved being a simple reversal of the absorption reaction brought about by the reduction of the partial pressure of hydrogen sulphide in the atmosphere adjacent to the solution.

If a solution of caustic soda is employed in the first instance, it should be, as above set forth, regenerated at first in the presence of carbon dioxide but upon subsequent conversion of the active sodium into sodium carbonate or bicarbonate, further regeneration may be effected by means of a gas containing little or no carbon dioxide.

In order to achieve a continuous process capable of employment over extended periods of time, the extent of the actification or regeneration must be such as to remove from the recirculated purifying liquid an amount of the impurity or impurities (either as such or in some other form) absorbed from the oil at least equal to the amount continuously removed from the oil treated.

I have found, however, that in the purification of oil from sulphur impurities by means of such solutions as I describe hereinabove, an increased efficiency, especially with regard to the actification stage, may be obtained by permitting the recirculating solution to accumulate considerable amounts of the above impurity and to so operate the actification step as to reduce the hydrogen sulphide content of the fouled liquid leaving the absorption stage by only about 50 percent before returning it to the absorption stage so that the actified liquid contains an amount of hydrogen sulphide substantially equal to the amount of hydrogen sulphide to be removed from the oil during its passage through the absorption stage.

Moreover, I have found that solutions containing as much as 100 grains of hydrogen sulphide or even more, depending somewhat upon the amount of impurity in the oil, are suitable for repurification of most oils and ordinarily I prefer to employ a solution containing at least about 70 grains of hydrogen sulphide per gallon.

An important advantage of so operating resides in the fact that when employing solutions obtaining accumulated hydrogen sulphide and with low actification ratios as I have described, the amount of air or other gas required for actification of the solution is considerably reduced.

For example, it has been found that a solution of sodium carbonate containing less than 100 grains of hydrogen sulphide per gallon required for actification down to a hydrogen sulphide content of say 10 grains per gallon at least approximately 1 cubic foot of actifier air per grain of hydrogen sulphide removed. On the other hand, a fouled solution of sodium carbonate containing 200 grains of hydrogen sulphide per gallon may be actified down to a hydrogen sulphide content of 100 grains per gallon by employing only approximately 0.5 cu. ft. of air per grain of hydrogen sulphide removed.

It will thus be apparent that the initial operation of the process, (assuming that a fresh solution of sodium carbonate or its equivalent is employed in the first instance) is largely devoted toward the building up of the desired hydrogen sulphide content in the recirculating solution. This does not, however, preclude the use of actifier air during this initial period of operation nor the removal of some hydrogen sulphide at this time. It will ordinarily be found, however, that until a relatively high concentration of hydrogen sulphide is obtained in the recirculating liquid comparatively little actification actually occurs.

Eventually, of course, as has been pointed out hereinabove, an amount of hydrogen sulphide must be removed which is equal to the amount absorbed from the oil. In practice, the actual amount of hydrogen sulphide removed in the actification stage may appear to be slightly less than this by reason of the fact that some of the hydrogen sulphide absorbed from the oil into the solution ordinarily enters into side reactions with the alkali resulting in the formation of inert products such, for example, as sodium thiosulphate.

It will, however, be found that portions of the solution must be discarded from time to time and replaced with a fresh solution in order to maintain the activity of the solution and in this manner the absorbed hydrogen sulphide not removed as such in the actifier is in fact removed from the solution, though in another form.

In order that my invention may be fully set forth and understood I now describe, with reference to the accompanying drawing, a preferred form and a preferred manner in which my invention is embodied and practiced. In the drawing:

The single figure is a more or less diagrammatic view, partly in elevation and partly in vertical section, of apparatus for effecting the substantially continuous and cyclic purification of an oil by means of a regenerable purifying liquid.

Referring to the drawing, oil to be purified from hydrogen sulphide is supplied from a source 1. This oil is conveyed by a pump 2 or any other suitable device through a conduit 3 terminating in a distributor 4 within an oil treating chamber or absorber 5.

In the present instance it is assumed that the oil to be treated has a lower specific gravity than the purifying solution and for this reason the oil is introduced to the absorber 5 in the lower portion thereof but preferably still somewhat removed from the bottom of the absorber 5. The oil introduced through the distributor 4 passes upward through the tower 5 in countercurrent to a flow of purifying liquid introduced above the point of introduction of the oil through a conduit 6 terminating in a distributor 7. The oil, by reason of its lower specific gravity, ultimately reaches the top of the absorber 5 and passes out through a conduit 8 having a vent 9.

The solution introduced through the conduit 6 to the absorber 5 may comprise a solution originally prepared by dissolving sodium carbonate in water and having a total alkalinity of from 1 to 6%. By reason of its higher specific gravity it passes downward through the absorber 5 in countercurrent to the rising flow of oil and during this intimate countercurrent contact absorbs hydrogen sulphide from the oil, thereby purifying the latter.

The thereby fouled solution reaching the bottom of the absorber 5 is withdrawn through a sealed conduit 11 having a vent 12 and one of a plurality of offtakes 13 located at suitable levels with respect to the mixture of liquids within the absorber 5. The solution passes through the appropriate offtake 13 and a conduit 14 into a fouled liquid tank 15 from which it is substantially continuously delivered by means of a pump 16 through a conduit 17 and sprays 18 to an actifier 20.

The actifier 20 is of any suitable design, for example, an upright tower partially filled with wooden hurdles 21 or other suitable gas-and-liquid contact media. It is provided at the bottom with a conduit 22 for introducing the actifying gas and an outlet 23 for removing the same after contact with the fouled liquid. In the present instance air is employed as the actifying gas, being drawn from the atmosphere as desired by a fan 24 connected with the conduit 22.

The fouled solution passes downward through the actifier 20 and through contact with the rising current of air is deprived of hydrogen sulphide. The thereby actified solution collects in a reservoir 25, which is conveniently located at the bottom of the actifier 20, and is then forced by a pump 26 through the conduit 6 into the absorber 5 for further contact with oil.

The purifying liquid is thus substantially continuously recirculated through a cycle comprising the absorber 5 and the actifier 20 and there is accomplished on the one hand a purification of the flowing oil and on the other a regeneration or revivification of the purifying liquid.

During the continuance of the process, as has been recited above, mechanical losses inevitably occur and certain side reactions ordinarily take place. These result in the consumption of sodium or its equivalent for the formation of inert side products, such as sodium thiosulphate, and make it necessary to supply the recirculating liquid from time to time with further amounts of sodium carbonate or its equivalent. Similarly, portions of the recirculating solution may be discarded from time to time in order to limit the building up of inert materials in the recirculating system.

The foul actifier air leaving the actifier 20 may be simply wasted into the atmosphere, or it may be used for combustion purposes, or it may be purified in any suitable manner when so desired.

As a typical example of my process, it may be desired to purify a petroleum oil containing 0.20% by weight of hydrogen sulphide per gallon with a degree of purification of 90%. For this purpose, I may employ a solution containing sodium carbonate and sodium bicarbonate of approximately 2% total alkalinity. In the absorption stage 0.9 gallon of this solution are introduced per gallon of oil introduced, and the solution is eventually allowed to become fouled after treatment of the oil to a hydrogen sulphide content of 200 grains per gallon.

In the actification stage, the solution is treated with 50 cu. ft. of air per gallon of solution whereby the hydrogen sulphide content of the solution is reduced to 100 grains per gallon. This represents an actification of 50%.

It will be understood that the term "absorbed sulphide" as used herein is intended to mean the reversible products of reaction between the hydrogen sulphide and the alkaline solution, such, for example, as NaHS. It does not, however, include inert products of reaction, such as $Na_2S_2O_3$ which may be formed to a slight extent.

However, as will be appreciated by those skilled in the art these figures will vary considerably according to the type of apparatus employed, the nature of the recirculating liquid and the like and, consequently, my invention is not limited to the specific details or examples set forth hereinabove but may variously be employed and embodied within the scope of the claims hereinafter made.

I claim as my invention:

1. In the process of purifying hydrocarbon oil from hydrogen sulphide by means of an alkaline carbonate solution recirculated through a cycle comprising an absorption stage in which said oil is treated with the solution and an actification stage in which the thereby fouled solution is treated for the removal of hydrogen sulphide therefrom, as such the improvement which consists in removing in said actification stage not more than about half of the content of absorbed hydrogen sulphide of the solution.

2. In the process of purifying hydrocarbon oil from hydrogen sulphide by means of an alkaline carbonate solution recirculated through a cycle comprising an absorption stage in which said oil is treated with the solution and an actification stage in which the thereby fouled solution is treated for the removal of hydrogen sulphide therefrom as such, the improvement which consists in accumulating absorbed hydrogen sulphide in the solution until the content of absorbed sulphide in the actified solution just prior to contact with the oil is about half of that in the fouled solution leaving the oil.

3. In the process of purifying hydrocarbon oil from hydrogen sulphide by means of an alkaline carbonate solution recirculated through a cycle comprising an absorption stage in which said oil is treated with the solution and an actification stage in which the thereby fouled solution is treated for the removal of hydrogen sulphide therefrom as such, the improvement which consists in reducing the absorbed hydrogen sulphide content of the solution traversing said actification stage to not less than about 70 grains per gallon of solution.

4. The process of purifying hydrocarbon oil which comprises treating the oil with an alkaline carbonate solution for removal of hydrogen sulphide from said oil, and containing an amount of previously absorbed sulphide approximately equal to that to be absorbed thereby from the oil, treating the fouled solution to remove as hydrogen sulphide the additional hydrogen sulphide absorbed by the solution from the oil and recirculating the solution for further purification of oil.

5. In the process of purifying hydrocarbon oil from hydrogen sulphide by means of an alkaline carbonate solution recirculated through a cycle comprising an adsorption stage in which said oil is treated with the solution and an actification stage in which the thereby fouled solution is treated for the removal of hydrogen sulphide therefrom as such, the improvement which comprises actifying the solution to such extent only that its content of absorbed sulphide after actification at least equals the difference between its hydrogen sulphide content after actification and its hydrogen sulphide content before actification.

6. In the process of purifying hydrocarbon oil from hydrogen sulphide by means of an alkaline carbonate solution recirculated through a cycle comprising an absorption stage in which said oil is treated with the solution and an actification stage in which the thereby fouled solution is treated with air for the removal of hydrogen sulphide therefrom as such, the improvement which comprises maintaining the solution throughout the cycle at such concentrations of absorbed hydrogen sulphide that not more than one-half cubic foot of air is required per grain of hydrogen sulphide removed.

CHARLES J. SMITH.